(12) United States Patent
Vehkomäki

(10) Patent No.: US 7,263,691 B2
(45) Date of Patent: Aug. 28, 2007

(54) PARSING STRUCTURED DATA

(75) Inventor: Tuomo Vehkomäki, Espoo (FI)

(73) Assignee: Nokia Corporation, Espoo (FI)

( * ) Notice: Subject to any disclaimer, the term of this patent is extended or adjusted under 35 U.S.C. 154(b) by 525 days.

(21) Appl. No.: 10/468,864

(22) PCT Filed: Jan. 30, 2002

(86) PCT No.: PCT/FI02/00071

§ 371 (c)(1),
(2), (4) Date: Aug. 20, 2003

(87) PCT Pub. No.: WO02/077856

PCT Pub. Date: Oct. 3, 2002

(65) Prior Publication Data

US 2004/0098668 A1    May 20, 2004

(30) Foreign Application Priority Data

Mar. 23, 2001  (FI) .................................. 20010609

(51) Int. Cl.
*G06F 9/45* (2006.01)
(52) U.S. Cl. ........................ 717/140; 717/144
(58) Field of Classification Search ........ 717/120–123, 717/136, 140–150; 715/513
See application file for complete search history.

(56) References Cited

U.S. PATENT DOCUMENTS

| | | | |
|---|---|---|---|
| 5,687,378 A | 11/1997 | Mulchandani et al. | 395/708 |
| 6,209,124 B1 * | 3/2001 | Vermeire et al. | 717/1 |
| 6,519,617 B1 * | 2/2003 | Wanderski et al. | 707/513 |
| 6,558,431 B1 * | 5/2003 | Lynch et al. | 707/500 |
| 2001/0037404 A1 | 11/2001 | Hafsteinsson et al. | 709/246 |
| 2001/0044811 A1 * | 11/2001 | Ballantyne et al. | 717/5 |
| 2001/0054048 A1 | 12/2001 | Kelsey | 707/513 |

FOREIGN PATENT DOCUMENTS

EP    0620527 A2    4/1994

OTHER PUBLICATIONS

Howard, Daniel; Mozilla.org: "Source Code Directories Overview": Introduction: Common Subdirectories, http://www.mozilla.org/docs/source-directories-overview.html, Aug. 28, 2000, The Mozilla Organization.

(Continued)

*Primary Examiner*—Meng-Al T. An
*Assistant Examiner*—Jason Mitchell
(74) *Attorney, Agent, or Firm*—Harrington & Smith, PC

(57) ABSTRACT

A method for parsing structured data has the steps of: receiving input data in a first computer language; generating a plurality of tokens according to the input data; building a context by using a grammar syntax comprising a set of rules, the context comprising a plurality of context steps in the form of at least one or more chains of context steps, the step of building the context comprising the sub-steps of: detecting if according to the grammar syntax a token is allowable in the context; and if the token is allowable, creating a new context step corresponding to the token, and the further steps for recovering an unallowable token: identifying a suitable context for the unallowable token in which context the token is allowable; and applying the token in the identified suitable context.

13 Claims, 6 Drawing Sheets

TOK

PAR

TRA

COM

TIME

OTHER PUBLICATIONS

Raggett, D.; "Clean Up Your Web Pages With HTML Tidy", http://tidy.sourceforge.net/docs/Overview.html, Aug. 4, 2000, 20 pages.

Kamin, Samuel; "Research on Domain-specific Embedded Languages and Program Generators"; Electrical Notes in Theoretical Computer Science 14; http://www.elsevier.nl/locate/entcs/volume14.html, 1998, 20 pages.

Ophel, John; "Breadth-First Parsing"; School of Computer Science and Computer Engineering, La Trobe University, Bundoora, Victoria, Australia, Research Memorandum 97/12, Dec. 4, 1997.

Quahid et al.; "Converting Web Pages into Well-formed XML Documents", Communications, 1999. ICC '99, 1999 IEEE International Conference on Vancouver, BC, Canada Jun. 6-10, 1999, pp. 676-680.

Linden; "Structured Document Transformations", PhD thesis, University of Helsinki, Department of Computer Science, Series of Publications A, Report A-1997-2, Chapters 1-3.

MIT, INRIA, "parser.c—HTML Parser", Keio University, 1998-2000 (W3C).

* cited by examiner

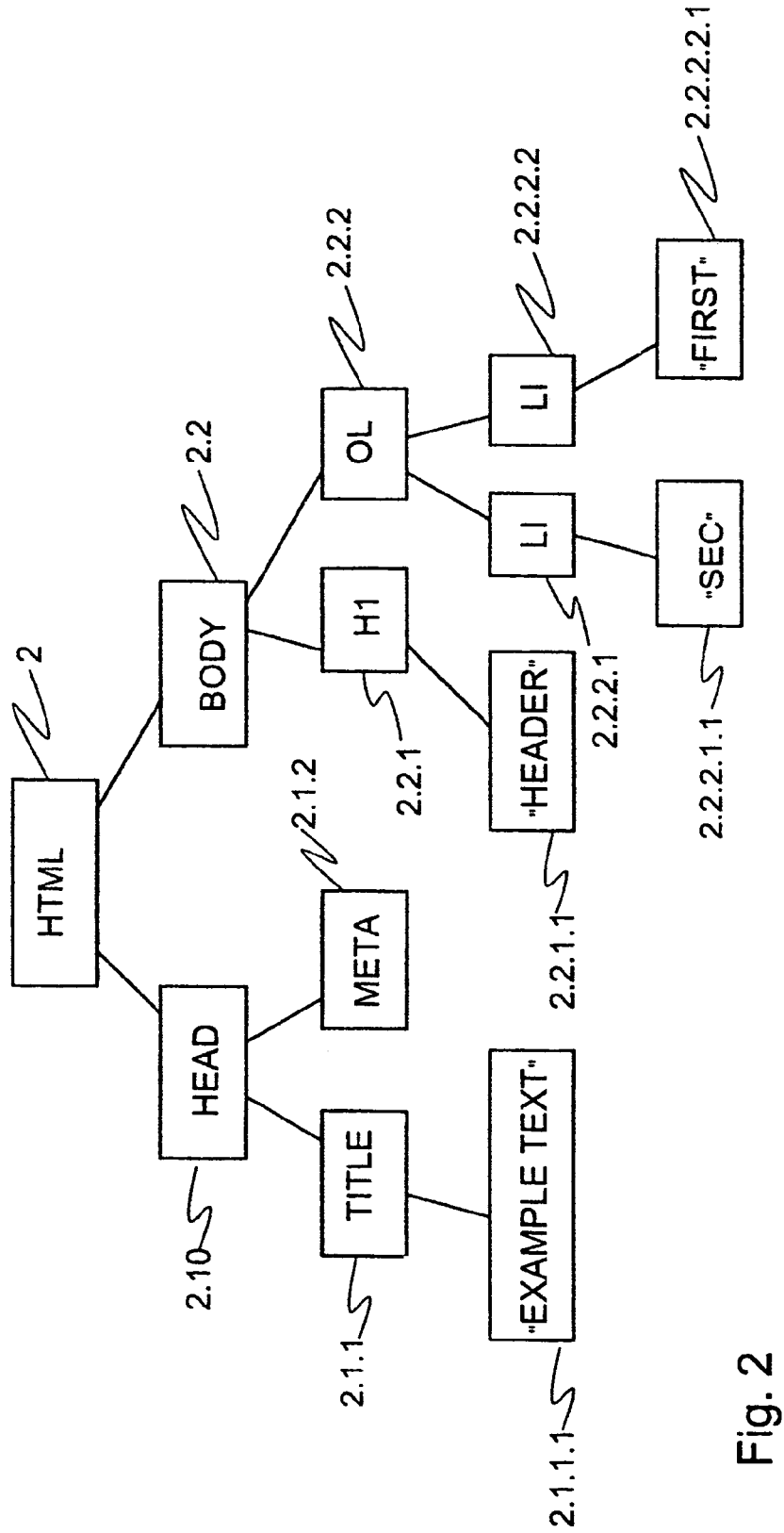

PARSING STRUCTURED DATA

FIELD OF THE INVENTION

The invention relates to document parsing, in particular to grammatical parsing of documents.

BACKGROUND OF THE INVENTION

The Internet has brought into being a number of new applications for various purposes. Underlying the rapid growth of the Internet is the HyperText Markup Language (HTML) standard for definition of documents in digital form. HTML is a subset of Standard Generalized Markup Language (SGML). Within SGML there is another, rapidly growing family of definitions, called extensible Markup Language (XML). Furthermore, there is Wireless Markup Language WML, which is especially designed for use in mobile communications. Both HTML and WML are subsets of XML.

HTML is used for an enormous number of documents published in the Internet. These documents are usually available to the public and provide a highly diverse source of information. The information in digital form is often referred to as content.

Unlike HTML, WML is designed particularly for wireless terminals. The amount of content in the form of WML is, as of yet, very limited compared to that in the form of HTML. A wireless terminal supporting only WML (an WML terminal) cannot use the content in HTML.

In order to make interesting HTML-formatted content available for use in WML terminals there are two options. Firstly, the content documents can be re-written in WML. Secondly, a network relaying HTML content to an WML terminal can perform an automatic conversion from HTML to WML when the terminal requests such content. This can be arranged by using between the WML terminal and the Internet a gateway server, which has the capability of converting content from HTML to WML.

Both HTML and XML are under constant development. HTML is converging towards XML, or HTML is becoming one instance of the XML language family.

The generation and reconstruction of HTML and XML documents is next described. A document is first broken up so that its formatting and meaning (actual content) are stored separately in different mark-up tags, or simply tags. In HTML documents, the tags are in a sequence and hence they are sequentially transmitted. Some tags contain structural information for defining the structure of a document the content defines, whilst some other tags contain the meaning in clips of information to be output to a user according to the defined structure. Typically, these clips are text.

A terminal receiving HTML, XML, or WML content receives a series of tokens. For reconstructing a document, or content, in a mark-up language, an assembler is required. The assembler puts back together the formatting and the meaning of the document. In the core of the assembler there is a parser that parses the data according to certain parse rules and a parsing language, that is grammar. The parser is typically a program controlling a processor of the terminal. The parser receives input in the form of sequential mark-up tags (interleaved with character data tokens) and breaks the input up into parts (for example, the nouns (objects), verbs (methods), and their attributes or options) that can then be managed by other software components. The parser may also check to see that all input has been provided that is necessary. In this context, the parser breaks the input into tokens and builds the structure according to the tokens. The tokens are typically a parser's internal representation of tags or textual data (character data token).

A parser is needed for a plurality of different HTML or XML processing applications, such as gateways, HTML-browsers, mobile terminals, authoring tools, and in some occasions, web servers.

Unfortunately, the constant development of HTML and XML results in a need to frequently update the equipment used for conversion between these languages in order to deal with new documents. Therefore, the parser contained in the equipment should be updated frequently to cope with different dialects of the languages. This has usually been carried out by building a new version of the assembler whenever required. For this purpose there are at least two tool programs, namely the "yacc" (Yet Another Compiler Compiler) and "lex". While these tool programs greatly facilitate building of the new parser, a syntax of the language to be parsed needs first to be described in a dedicated language. The syntax defines how the parsing should be carried out. When the new parser is ready, the syntax description (the dedicated language) is processed with filtering tools to generate a source code representation of the parser. The filtering tools typically generate C programming language. The produced parser is a monolithic piece of software, which combines the syntax rules and the parser logic. Finally, the generated parser source code is compiled and linked with the application code to produce an executable program with parser functionality. The drawback of this procedure is the high amount of labour required to adapt the equipment to changes in input language (HTML, XML).

Typically modem XML documents identify a grammatical definition that will be searched from a network and thus dynamically replaceable grammatical definition is required. Typically a particular reference in the document is used for the identification of the grammar definition.

U.S. Pat. No. 5,687,378 provides an alternative procedure that allows the dedicated syntax description language to be changed without recompiling or re-linking the assembler. This is based on the use of switchable syntax modules each comprising a different set of parse rules. The parse rules define the grammar used by the parser. In this way, the actual parser engine is separated from the rules used and the rules can be easily changed. While the parsing rules can thus be changed and the adaptation to new description languages or dialects has become easier, certain problems remain.

The parsers generated with standard tools become rather complex and memory consuming, since they provide complex syntax description languages for covering more descriptive languages than XML. In the case of XML, a less descriptive syntax description language would suffice. If the parser were optimised for XML, it would be smaller. Furthermore, a great number of the pages present in the Internet are deficient. The defects in these pages hinder and/or slow down the parsing. It is also known, that some content providers may deliberately generate certain errors in order to prevent or harm the use of certain applications, such as certain WWW-browsers.

SUMMARY OF THE INVENTION

According to a first aspect of the invention, there is provided a method for parsing structured data comprising the steps of:
  receiving input data in a first computer language;
  generating a plurality of tokens according to the input data;

building a context by using a grammar syntax comprising a set of rules, the context comprising a plurality of context steps in the form of at least one or more chains of context steps, the step of building the context comprising the sub-steps of:
  detecting if according to the grammar syntax a token is allowable in the context; and
  if the token is allowable, creating a new context step corresponding to the token;

characterised in that the method comprises the further steps for recovering an unallowable token:
  identifying a suitable context for the unallowable token in which context the token is allowable; and
  applying the token in the identified suitable context.

Advantageously, the method makes use of all the correct information of partly erroneous data and tries to recover errors so that even erroneously presented information could be used. The parsing and error recovery as a part of it is fast and requires reduced amount of computing and memory resources.

Preferably, the identifying the suitable context comprises searching for a least different allowable context for the token using the grammar syntax.

Advantageously, the searching for the least different allowable context minimises the (erroneous) change in the structure of the information on recovery.

Preferably, the applying the token comprises modifying the context to be equal to the least different allowable context.

Preferably, the searching the least different allowable context attempts to generate a new context step according to a rule specific to the unallowable token to complement the context so that the unallowable token becomes allowable. In this way, a forgotten or deliberately dropped token can automatically be inserted in order to estimate the likely context.

Preferably, the searching the least different allowable context proceeds backwards along the chain of context steps one by one until an allowable context is found. In this way, a forgotten or purposely dropped end token can be overcome.

Preferably, the method first attempts to complement the context by adding such a context step, which is allowable, according to the syntax, both to the preceding context step and to the unallowable context step. Preferably, if such complementing fails, the backwards proceeding searching is performed.

Preferably, after each context step proceeded backwards, the method attempts again to complement the context to conform to the token. In this way, it is possible to overcome the lack of a missing end token or another token. In this way, the structure of the data is changed least, because in a context of structured data, the last steps have the least significance. It is most probable that the first allowable context step in reverse order in the context chain is correct for the token that is not allowable in a certain context in which it was to be used.

Preferably, a rule specific for the generic syntax of the first computer language is used to determine whether a token is allowable in a context. This allows detection of such errors that relate to the generic type of the first computer language.

Preferably, a rule specific for a type of token is used in the searching step to determine whether a token is allowable in a context. This also allows recovery from such errors that cannot be recovered by using a rule specific for the generic syntax of the first computer language.

Preferably, both syntax and type of token specific recovering methods are used for recovering an unallowable token.

Preferably, the method comprises a further step of dynamically switching to use another grammar syntax to adapt to a different language or to a different dialect of the language.

According to a second aspect of the invention there is provided a parser comprising:
  an input for receiving input data in a first computer language;
  a tokeniser for generating a plurality of tokens according to the input data;
  a context builder for building a context by using a grammar syntax comprising a set of rules, the context comprising a plurality of context steps in the form of at least one chain of context steps, the context builder being configured to:
    detect if according to the grammar syntax a token is allowable in the context; and
    if the token is allowable, to create a new context step corresponding to the token;

characterised in that
  the parser further comprises for recovering an unallowable token:
    an identifying block for identifying for the unallowable token a suitable context in which the token is allowable; and
    the tokeniser is configured to apply the token in the identified suitable context.

According to a third aspect of the invention there is provided a processing unit having a parser comprising:
  an input for receiving input data in a first computer language;
  a processor for generating a plurality of tokens according to the input data;
  a context builder for building a context by using a grammar syntax comprising a set of rules, the context comprising a plurality of context steps in the form of at least one chain of context steps, configured to:
    detect if according to the grammar syntax a token is allowable in the context; and
    if the token is allowable, to create a new context step corresponding to the token;
  characterised in that the parser further comprises for recovering an unallowable token:
    identifying block for identifying for the unallowable token a suitable context in which the token is allowable; and
    the processor is configured to apply the token in the identified suitable context.

Preferably, the processing unit is a device selected from a group consisting of: a translator, a gateway, a mobile station and a web server. The device has the advantage of being able to recover from some errors in the input data.

According to a fourth aspect of the invention there is provided a computer program product for controlling a parser comprising:
  parser executable computer program code to enable the parser to receive input data in a first computer language;
  parser executable computer program code to enable the parser to generate a plurality of tokens according to the input data;
  parser executable computer program code to enable the parser to build a context by using a grammar syntax comprising a set of rules, the context comprising a plurality of context steps in the form of at least one chain of context steps, the code being configured to:

detect if according to the grammar syntax a token is allowable in the context; and if the token is allowable, to create a new context step corresponding to the token;

characterised in that the computer program product further comprises for recovering an unallowable token:

parser executable computer program code to enable the parser to identify for the unallowable token a suitable context in which the token is allowable; and parser executable computer program code to enable the parser to apply the token in the identified suitable context.

According to a fifth aspect of the invention there is provided a system comprising a mobile telecommunications network and a gateway having a parser that comprises:

an input for receiving input data in a first computer language;

a processor for generating a plurality of tokens according to the input data;

a context builder for building a context by using a grammar syntax comprising a set of rules, the context comprising a plurality of context steps in the form of at least one chain of context steps, configured to:

detect if according to the grammar syntax a token is allowable in the context; and if the token is allowable, to create a new context step corresponding to the token;

characterised in that the parser further comprises for recovering an unallowable token:

an identifying block for identifying for the unallowable token a suitable context in which the token is allowable; and the processor is configured to apply the token in the identified suitable context.

BRIEF DESCRIPTION OF THE DRAWINGS

The invention will now be described, by way of example only, with reference to the accompanying drawings, in which FIG. 1 shows a set of HTML definitions defining an exemplary structure;

FIG. 2 shows a diagram of the structure of FIG. 1;

DETAILED DESCRIPTION

FIG. 1 shows a set of HTML definitions, or (markup) tokens 10, for defining the structure of an exemplary HTML document. Each token is enclosed by < and > marks or by quotation marks. The tokens surrounded by < and > marks usually contain information concerning a structure of data to form a context to user data, whereas the tokens enclosed by quotation marks represent the user data concerning a context. In the structure of FIG. 1, a sequence of tokens contains a first list item token LI 10, a first end of list item token /LI 11, a second list item token LI 12 and a second end of list token /LI 14.

In HTML, a document is arranged in a tree-like structure by definitions determining the various branches of the tree. FIG. 2 a shows tree-like view of the structure of the document whose tokens are shown in FIG. 1. For example, a token HTML 2 represents the highest level of the tree-like structure, and tokens HEAD 2.1 and BODY 2.2 represent two main branches. The token HEAD 2.1 defines the header of the document, comprising again two branches, TITLE 2.1.1 for defining the title of the header and META 2.1.2 describing the document in various ways. At the bottom of the header branch, under the TITLE 2.1.1, there is a token 2.1.1.1 containing a string of text "EXAMPLE TEXT", which is to be used as the header. The second main branch divides into tokens 2.2.1 H1 and 2.2.2 OL. H1 has one subordinate token 2.2.1.1 HEADER. OL 2.2.2 has two subordinate tokens, 2.2.2.1 and 2.2.2.2, each representing one list item LI in an ordered list OL. The list items (tokens 2.2.2.1 and 2.2.2.2) have respective subordinate tokens defining the content of the list items. In this example, the text of the first list item 2.2.2.1.1 is SEC and the text of the second list item 2.2.2.2.1 is FIRST.

It is helpful in understanding the invention to realise that structured languages such as HTML and XML cause a tree-like structure, where the most significant definitions are on first hierarchy levels as opposed to the least significant definitions at the end of the branches of the tree. For example, the token 2.2.2.2.1 only affects to one list item, but the token 2.2 defines the start of the entire body containing the ordered list OL.

Figure 3:
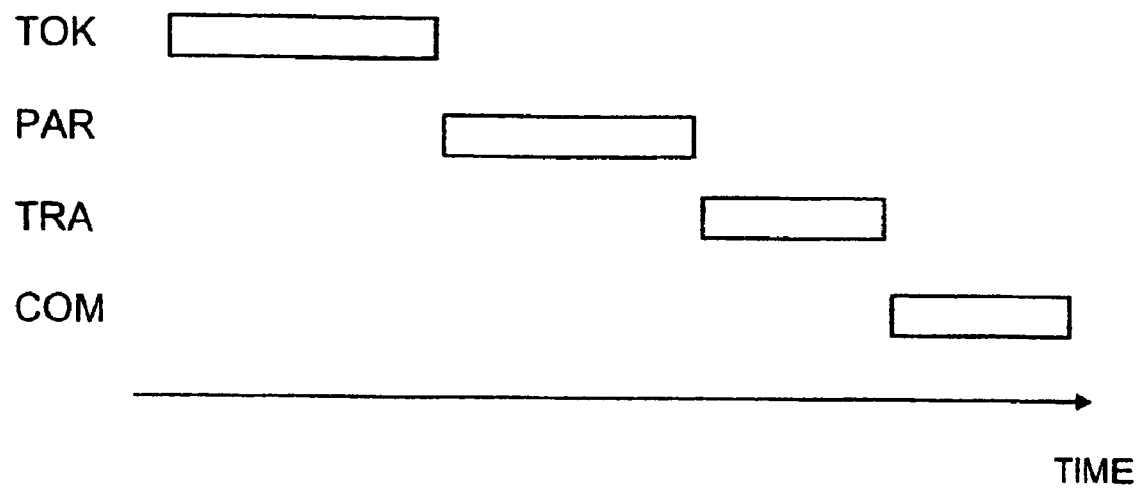
FIG. 3 shows a generic timing chart of parsing of structured data in a sequential order according to the prior art.

The structured hierarchy of HTML documents has been utilised by arranging the steps required for translation of them into other languages, as is shown in FIG. 3. If an HTML document is to be translated into another language or into a dialect of HTML, the tokens are first generated in a tokenising phase TOK. After tokenising there is a parsing phase PAR, in which the tokens are parsed to generate a structure. A translation phase TRA follows, in which the structure can be described by the destination language or dialect. After the translation phase TRA is completed, the result can be transmitted over a communications channel in a transmitting phase COM. This approach is easy to manage and provides an opportunity for enhanced robustness by allowing the tokens to be parsed regardless of their order. However, one disadvantage of the process is that the amount of time it takes can be as much as the sum of all its phases. To overcome this problem, there is an alternative translation process that utilises the structure of the source and destination languages to accelerate the parsing, as shown in FIG. 4.

Figure 4:
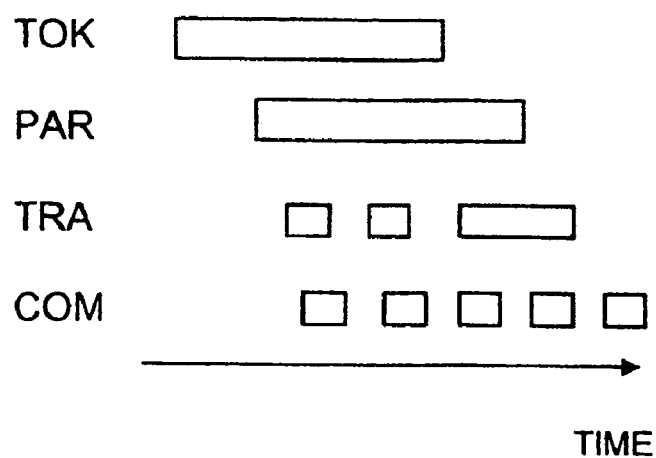
FIG. 4 shows a generic timing chart of parsing of structured data in a partly parallel order according to a preferred embodiment of the invention.

FIG. 4 shows a timing chart of parsing of structured data in a parallel fashion, according to a preferred embodiment of the invention. The process differs from the process shown in FIG. 3 in that soon after the tokenising has started, the subsequent phases are started whilst the tokenising is progressing. During tokenising, the phases are started in the order of the parsing phase PAR, the translation phase TRA and the transmitting phase COM. Thus, all of these phases occur in parallel. In this example, the transmitting is started before the end of the tokenising. These processes can be carried out partially in parallel since each branch of the tree-like structure can be processed as separate units.

The error recovery process will now be described. Referring back to FIG. 1, lack of the first end of list token 11 would cause an error in the parsing of the tokens. Strictly speaking, the second list token 12 may not be subordinate to the first list item 10. In this particular example, it can be appreciated that appearance of a new list item should automatically cause parsing to close the previous list item branch. After closure of the previous list branch, a new branch should be created for a new list item. Such induction enables recovery of at least some errors. Two types of correction methods are next handled. In a first type of method, correction is based on a generic feature of the language being interpreted. In a second type of method, correction is based on a specific rule (that is, to the type of token). The preferred embodiment of the invention comprises capability for both types of methods. They will now be explained referring to corresponding FIGS. 5 and 6.

Figure 5:
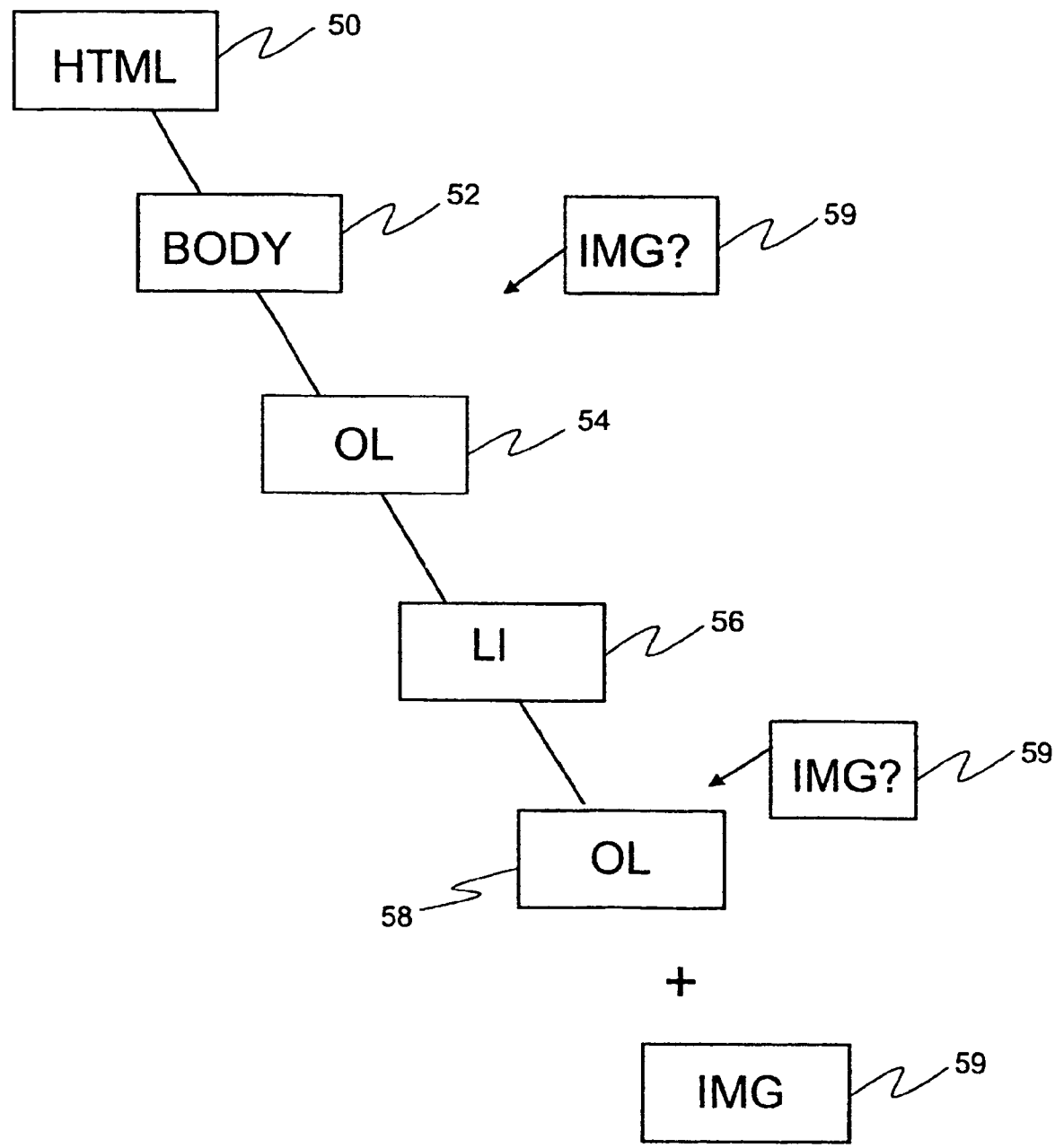
FIG. 5 shows an example of generic correction of a token according to the preferred embodiment.

FIG. 5 shows an example of generic correction of a token according to the preferred embodiment of the invention. In this case, a sequence of tokens HTML 50, BODY 52, Object List token OL 54, List Item token LI 56, Object List token OL 58 and an ImaGe IMG 59 is received in that order, but the last token IMG 59 mismatches with the preceding token OL 58. Applicability of each token to match with that last token IMG 59 is tested to find the likely correct position for the mismatched last token 59. In this example, the last token IMG 59 is an image token that, according to grammar rules, cannot be subordinate to the LI 56. Neither can it follow next the OL 54 that precedes the LI 56. Instead, it can be subordinate to token BODY 52 that precedes the OL 54. Therefore, this position is found in an efficient processing manner by proceeding backwards along the parsed structure. Most frequently, the correct position of an unallowable token is close to the end at which it is located. By using a reverse procedure (proceeding backwards along a branch) it is possible to find the most likely correct position with a minor amount of processing. Such a procedure also causes the smallest possible (erroneous) change in the result because the changes are primarily carried out on the least significant parts of the context (farthest from the root of the tree-like structure).

Figure 6:
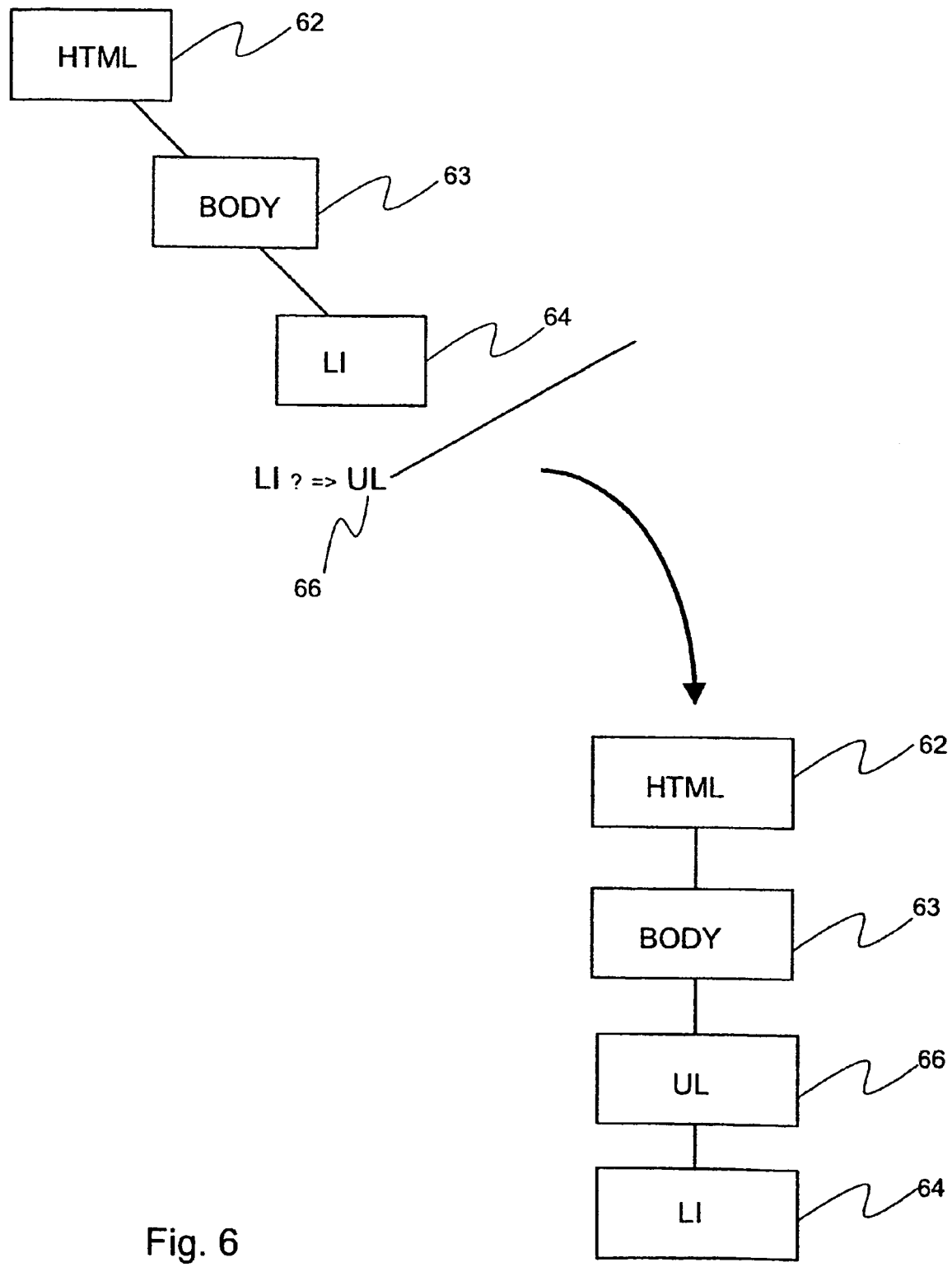
FIG. 6 shows a flow chart of a recovery process to define a correct context for an erratic token according to the preferred embodiment.

FIG. 6 shows a rule-specific recovery process to define a correct context for an erraneous token, according to the preferred embodiment of the invention. In this case, a sequence of tokens HTML 62, BODY 63 and LI 64 is received. The LI 64 cannot be subordinate to a BODY token. Therefore, a rule specific correction method is used to add a proper preceding token, in this case a user list token UL 66. Typically, there is an additional test whether such added token is appropriate considering its subordinate, in this case the BODY 63. If this test succeeds, the added token is deemed to be valid. The LI 64 is indeed a valid subordinate to the UL 64 and the test succeeds. As result, the new sequence of tokens is the HTML 62, the BODY 63, the UL 66 and the LI 64. In this case, the LI 64 can be subordinate to only one type of token, UL. Hence, the UL 66 is automatically added.

In an embodiment of the invention, it is detected whether an appropriate token is not the only alternative. If other alternatives exist, a heuristic analysis is used to determine the most likely alternative that should be used. For instance, the parser may maintain a table of probabilities for each possible different series of subsequent tokens. Then, the parser selects such a token to be added that in series with a pre-existing adjacent token has the greatest probability. In yet another and more simple embodiment, instead of heuristic analysis, the parser picks an additional token substantially randomly within the group of allowable tokens (alternatives).

If the added token is not appropriate, the added token may be simply abandoned. A more intelligent approach is to attempt adding another token between the BODY 63 and the added token in order to end up with a valid branch. This allows recovery even in cases where more than one token is missing, but the missing tokens can be reasonably deduced from the context.

Figure 7:
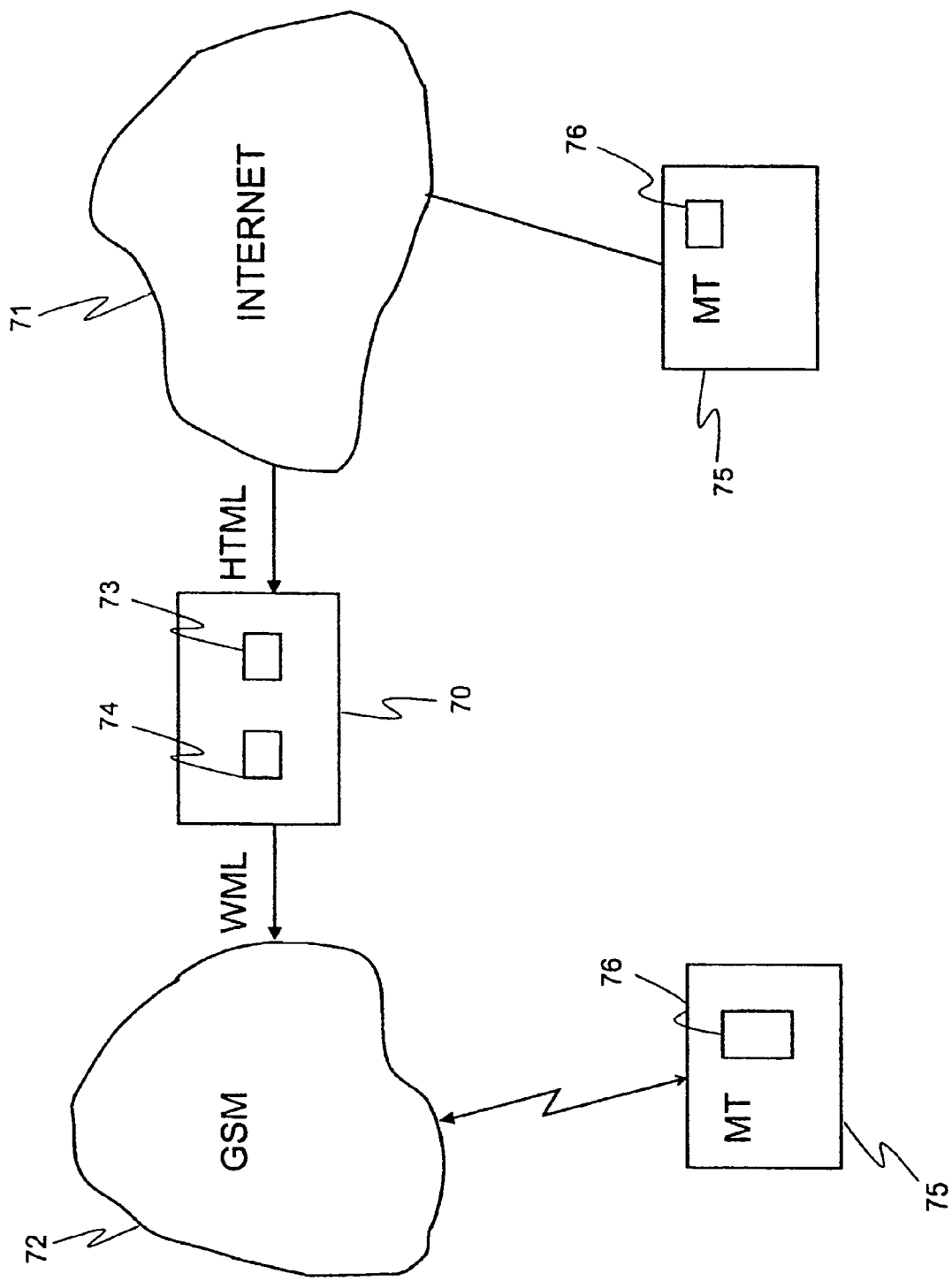
FIG. 7 shows a system according to the preferred embodiment of the invention.

FIG. 7 shows a system according to the preferred embodiment of the invention. The system comprises two data communications networks: a GSM telephone network 72 and an IP (Internet Protocol) network 71, such as the Internet or an intranet. The two data communications networks are linked by a gateway 70. The gateway 70 comprises a first parser 73 (for HTML) and a second parser 74 (for WML) for translating data (content) between HTML and WML. A terminal 75 is coupled to the GSM telephone network 72. The terminal is a dual-mode terminal such as a laptop personal computer PC having a GSM module. In the preferred embodiment, the same terminal also has functionality for connecting to the IP network 71. The terminal comprises a parser 76 for processing WML documents.

Figure 8:
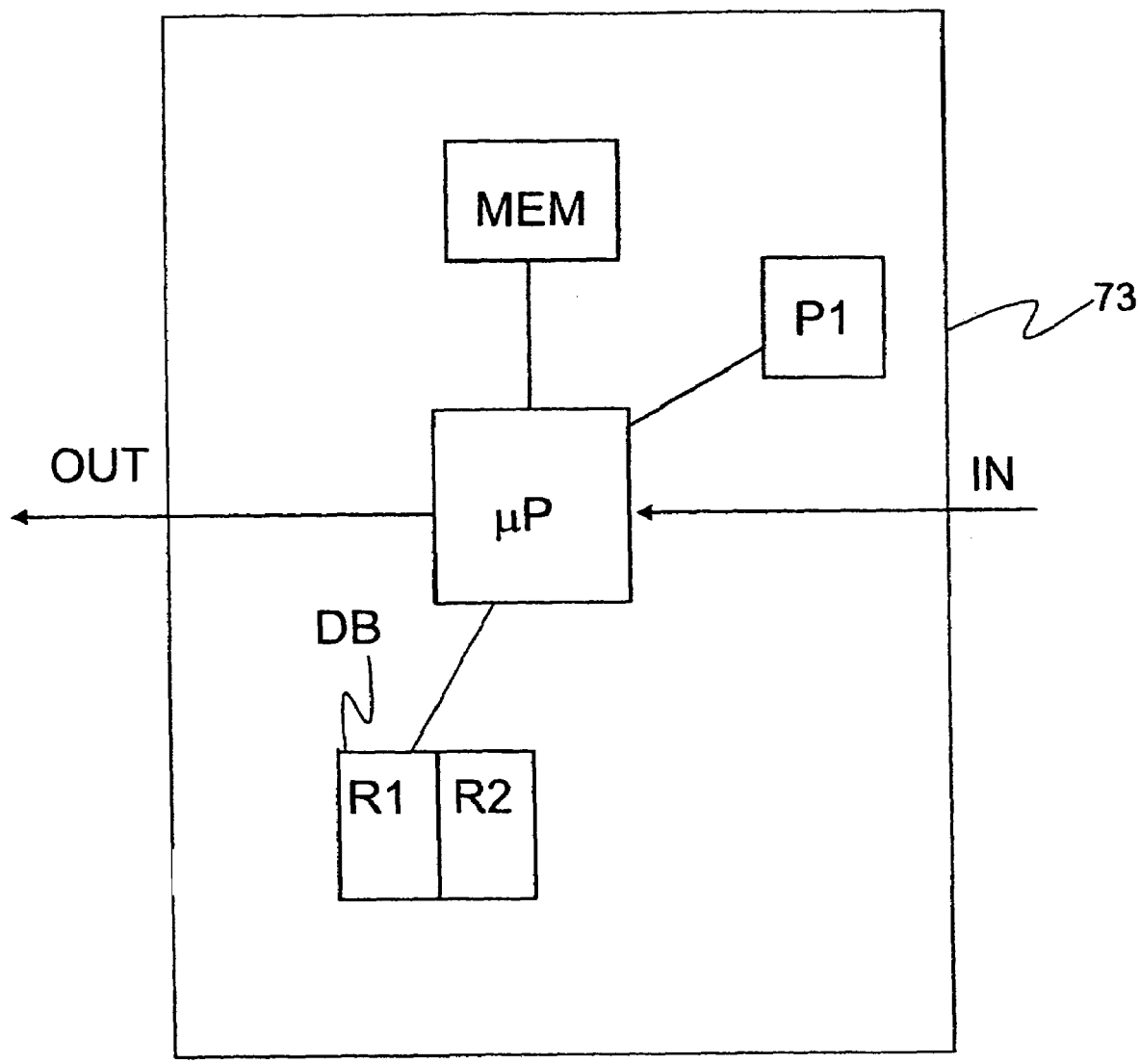
FIG. 8 shows a block diagram of a parser of the system shown in FIG. 7.

FIG. 8 shows a block diagram of the first parser 73 of FIG. 7. The first parser has a processor µP, an input IN for receiving data to the processor µP, an output OUT for outputting data from the processor µP and thus from the parser 73 to outside of the parser 73, parser software P1, memory MEM, and a database DB of parsing rules comprising two different sets of parsing rules R1, and R2.

In operation, the processor µP receives a set of tokens in an input language, in this case in HTML. The processor µP determines the language and/or dialect of the input language and retrieves a corresponding set of parsing rules from the database DB. Using the parser software P1 and the memory MEM, the processor µP generates a structure according to the received set of tokens. Then, the processor µP sends the structure to the second parser 74 so that the second parser 74 can generate a new set of tokens, in an output language, according to its parsing rules.

The structure of the second parser may correspond to that of the first parser. In the preferred embodiment, the second parser 74 has also a database comprising two or more sets of parsing and translation rules so that it adapts to produce a correct language or dialect.

Using the two parsers 73 and 74, the gateway 70 can translate data from one markup language to another. The gateway 70 may adapt dynamically to different languages it processes. The possibility to adapt the second parser to different languages also allows use of one gateway for serving various different types of networks.

According to the preferred embodiment, the database DB is updated dynamically on demand. For example, the processor may recognise an input language or dialect for which it does not have a set of rules. In this case, the gateway may have a connection to another rule set database (that may be centrally managed) and retrieve a proper set of rules to its own database. In this way, the parser can automatically maintain itself up to date without any hand-made reconfiguration.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

The invention claimed is:

1. A method for parsing structured data with plural branches comprising the steps of:
   receiving input data with the plural branches in a first computer language;
   generating a plurality of tokens according to the input data; and
   building a context and processing a built context in units of the plural branches by using a grammar syntax comprising a set of rules, wherein the steps of receiving, generating and building occur in parallel across at least a portion of the input data;
   the context comprising a plurality of context steps in the form of at least one or more chains of context steps, the step of building the context comprising the sub-steps of:
      detecting if according to the grammar syntax a token is allowable in the context;
      and if the token is allowable, creating a new context step corresponding to the token; and
      if the token is unallowable recovering the unallowable token by identifying a suitable context for the unallowable token in which context the token is allowable, and applying the token in the identified suitable context.

2. A method according to claim 1, wherein the identifying of the suitable context comprises searching for a least different allowable context for the token using the grammar syntax.

3. A method according to claim 2, wherein the applying the token comprises modifying the context to be equal to the least different allowable context.

4. A method according to claim 2, wherein the searching for the least different allowable context attempts to generate a new context step according to a rule specific to the unallowable token to complement the context so that the unallowable token becomes allowable.

5. A method according to claim 1, wherein the method first attempts to complement the context by adding such a context step, which is allowable, according to the syntax, both to the preceding context step and to the unallowable context step.

6. A method according to claim 5, wherein, if such complementing fails, a backwards proceeding searching for the suitable context is performed.

7. A method according to claim 1, wherein at least one of a rule specific for the generic syntax of the first computer language and a type of token is used for determining whether a token is allowable in a context.

8. A method according to claim 1, wherein the method comprises a further step of dynamically switching to use another grammar syntax to adapt to a different language or to a different dialect of the language.

9. A parser comprising:
   a processor coupled to a memory for storing parser software, said processor comprising an input for receiving input data with plural branches in a first computer language; and said parser software comprising:
   a tokenizer for generating a plurality of tokens according to the input data;
   a context builder for building a context and processing a built context in units of the plural branches by using a grammar syntax comprising a set of rules, wherein receiving input, generating a plurality of tokens and building a context occur in parallel across at least a portion of the input data;
   the context comprising a plurality of context steps in the form of at least one chain of context steps, the context builder being configured to detect if according to the grammar syntax a token is allowable in the context, and if the token is allowable, to create a new context step corresponding to the token; and
   if the token is unallowable an identifying block for identifying for the unallowable token a suitable context in which the token is allowable;
   wherein the tokenizer is configured to apply the token in the identified suitable context.

10. A computer program product, embodied on a computer readable memory, for controlling a parser comprising:
   parser executable computer program code to enable the parser to receive input data with plural branches in a first computer language;
   parser executable computer program code to enable the parser to generate a plurality of tokens according to the input data;
   parser executable computer program code to enable the parser to build a context and process a built context in units of the plural branches by using a grammar syntax comprising a set of rules, wherein receiving input data, generating a plurality of tokens and building a context occur in parallel across at least a portion of the input data;
   the context comprising a plurality of context steps in the form of at least one chain of context steps, the code being configured to detect if according to the grammar syntax a token is allowable in the context, and if the token is allowable, to create a new context step corresponding to the token; and
   parser executable computer program code to enable the parser to identify for an unallowable token a suitable context in which the token is allowable and to enable the parser to apply the token in the identified suitable context.

11. A processing unit having a parser comprising: an input for receiving input data with plural branches in a first computer language;
   a processor for generating a plurality of tokens according to the input data;
   a context builder for building a context and processing a built context in units of the plural branches by using a grammar syntax comprising a set of rules, wherein receiving input data, generating a plurality of tokens and building a context occur in parallel across at least a portion of the input data;
   the context comprising a plurality of context steps in the form of at least one chain of context steps, configured to detect if according to the grammar syntax a token is allowable in the context, and if the token is allowable, to create a new context step corresponding to the token; and
   an identifying block for identifying for an unallowable token a suitable context in which the token is allowable;
   wherein the processor is configured to apply the token in the identified suitable context.

12. A processing unit according to claim 11, comprising a device selected from a group consisting of: a translator, a gateway, a mobile station and a web server.

13. A system comprising a mobile telecommunications network and a gateway having a parser that comprises:
   an input for receiving input data with plural branches in a first computer language;

a processor for generating a plurality of tokens according to the input data;

a context builder for building a context and processing a built context in units of the plural branches by using a grammar syntax comprising a set of rules, wherein receiving input data, generating a plurality of tokens and building a context occur in parallel across at least a portion of the input data;

the context comprising a plurality of context steps in the form of at least one chain of context steps, configured to detect if according to the grammar syntax a token is allowable in the context, and if the token is allowable, to create a new context step corresponding to the token; and an identifying block for identifying for an unallowable token a suitable context in which the token is allowable;

wherein the processor is configured to apply the token in the identified suitable context.

* * * * *